Jan. 8, 1963 P. J. MAZZIOTTI ETAL 3,071,944
UNIVERSAL JOINT

Filed March 6, 1961 2 Sheets-Sheet 1

INVENTOR.
PHILIP J. MAZZIOTTI
EVERETT H. SHARP
BY Walter E. Pavlick
ATTORNEY

Jan. 8, 1963   P. J. MAZZIOTTI ETAL   3,071,944
UNIVERSAL JOINT
Filed March 6, 1961   2 Sheets-Sheet 2

INVENTOR.
PHILIP J. MAZZIOTTI
EVERETT H. SHARP
BY Walter E. Pavlich
ATTORNEY

United States Patent Office 3,071,944
Patented Jan. 8, 1963

3,071,944
UNIVERSAL JOINT
Philip John Mazziotti, Toledo, Ohio, and Everett H. Sharp, Lambertville, Mich., assignors to Dana Corporation, Toledo, Ohio, a corporation of Virginia
Filed Mar. 6, 1961, Ser. No. 93,413
12 Claims. (Cl. 64—21)

This invention relates to universal joints in general and more specifically to constant velocity universal joints wherein the joint members are urged relative to each other in a predetermined axial direction in response to the imposition of torque thereto.

Constant velocity universal joints are relatively old in the art and find widespread use in applications where a uniform transfer of rotary motion is desired at relatively large operating angles. One such application of this type of joint is in the swing axle type suspension of vehicles wherein the axle shaft portions are independent of each other and may pivot vertically with respect to the fixed differential unit driving the axle shafts. Since this pivoting may be of a high degree of angularity, and it is preferred to transfer torque to the ground wheels from the differential unit at a uniform rotational velocity, a constant velocity universal joint is the most satisfactory means to couple the differential unit with the independent axle shafts.

Swing axle type suspensions offer numerous advantages, such as reducing the unsprung weight of the vehicle, since the differential unit may be suspended from the sprung frame. However, suspensions of this type have a marked tendency to allow the rear of the vehicle to squat during acceleration and lift during braking due to the weight transfer of the vehicle. One solution for this problem as illustrated in Patent Number 2,898,750 comprises using a suspension of proper design in combination with an axle shaft to differential coupling wherein driving torque will extend the effective length of the axle shaft while braking torque will reduce the effective length of the axle shaft. This extension and reduction in length tends to induce inward or outward forces to substantially balance the downward or upward forces exerted on the suspension by the rear portion of the vehicle under the influence of acceleration or braking; that is, it results in "Anti-Squat."

The structure which has been disclosed in Patent Number 2,898,750 to accomplish this extension and reduction (telescoping) incorporates means for inducing the desired telescoping. However, this patent and other prior art structures while inducing the desired telescoping do not transfer rotary motion at constant velocity. As previously stated, since the axle shaft will operate at large angles relative to the differential unit a constant velocity joint is necessary to obtain uniform rotation of the driven member.

In a copending application, Serial Number 93,383, structures have been disclosed which induce the desired telescoping action and in addition transmit rotary motion at a constant velocity. The present invention is an improvement over this copending application and has the following objects:

It is an object of this invention to provide a constant velocity universal joint which in itself will accommodate relative angular and axial displacement between the driven and driving means.

It is another object of this invention to provide such a constant velocity universal joint in which the members thereof are urged relative to each other in a predetermined axial direction in response to the imposition of torque thereto.

It is a further object of this invention to provide a constant velocity universal joint which when incorporated in a swing axle type suspension will have an anti-squat effect.

It is a still further object of this invention to provide such a universal joint which is simple to construct, easy to assemble yet inexpensive and durable.

In one preferred embodiment of this invention the universal joint comprises an outer race adapted to be rotated by a differential unit and an inner race formed as an integral part of an axle shaft. The inner and outer races are each provided with a first and a second plurality of helical grooves. The first plurality of grooves in each member has a greater helix angle than and is inclined in a direction opposite to the second plurality of grooves. The first and second plurality of grooves in the inner race are oppositely inclined or mirror images of the first and second plurality of grooves in the outer race. The first and second plurality of grooves in the inner race cooperate with the first and second plurality of grooves in the outer race respectively and since the cooperating grooves are mirror images of each other they are disposed in intersecting relationship. A drive ball is positioned at the intersection and in registration with the cooperating grooves.

Since the grooves are helically disposed, upon the transfer of torque between the inner and outer race the grooves impose an axial force upon the drive balls. The first plurality of cooperating grooves impose an axial force in one direction and the second, oppositely inclined, plurality of cooperating grooves impose an axial force in the opposite direction. Thus, the balls in the first plurality of cooperating grooves tend to move in one direction and the balls in the second plurality of cooperating grooves tend to move in the opposite direction. However, a ball cage is provided which embraces all the drive balls to insure movement thereof as a unit. Since the first plurality of cooperating grooves have a greater helix angle than the second plurality of cooperating grooves, the axial forces supplied by the grooves on the balls will be unbalanced and the balls and races will be urged to move relative to each other resulting in lengthening or shortening of the axle shaft.

In another preferred embodiment, a different method is employed to obtain unbalanced axial forces. Instead of having the grooves of a different helix angle, the angle is maintained the same for both cooperating pluralities of oppositely inclined grooves; however, the number of grooves in each race inclined in one direction is greater than the number of grooves inclined in the opposite direction.

Further objects and advantages of this invention will become apparent from the following detailed description taken in connection with the accompanying drawings wherein.

Figure 1:
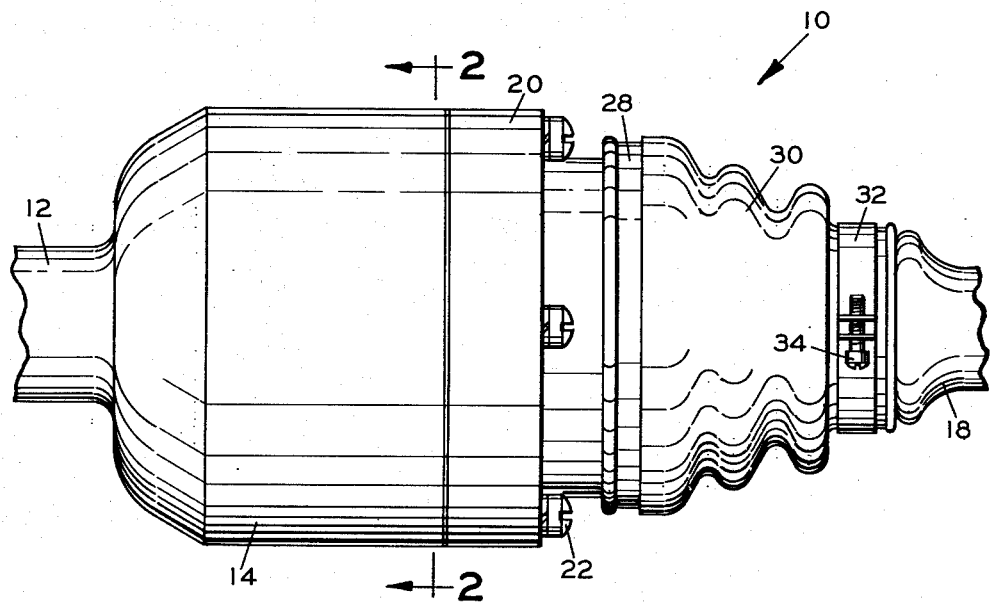
FIG. 1 is a side elevational view of a universal joint embodying this invention.
Figure 3:
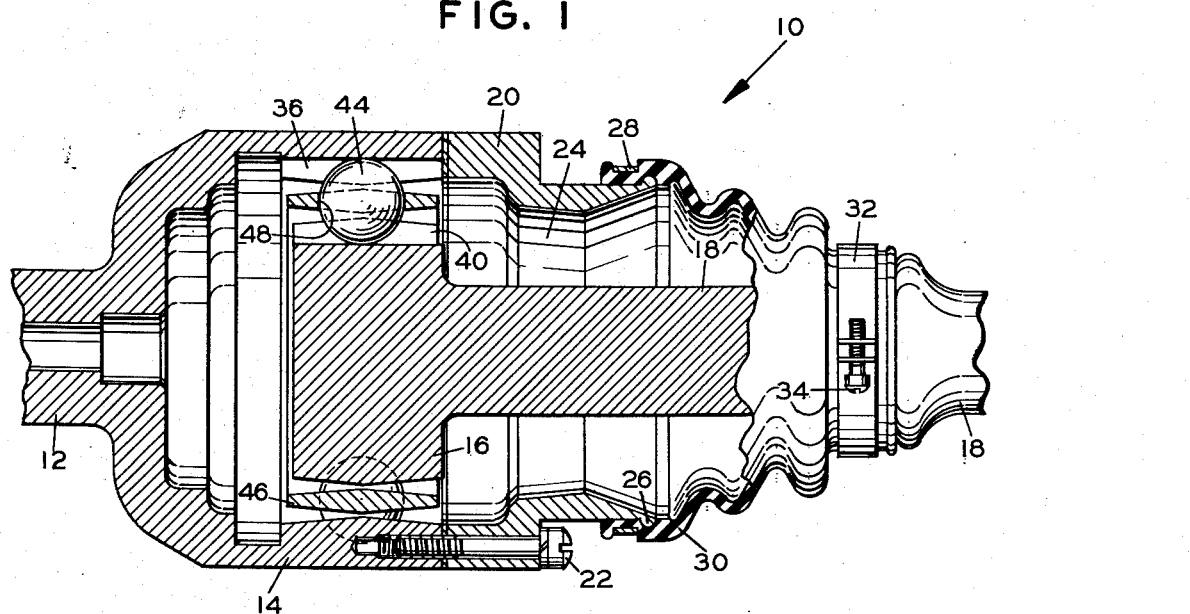
FIG. 3 is a partial longitudinal sectional view of the universal joint shown in FIG. 1 taken on line 3—3 of FIG. 2.

Referring now to the drawings and more particularly to FIG. 3 the universal joint indicated generally at 10 comprises a shaft portion 12 which is adapted to be fixed axially and angularly relative to a differential unit (not shown). The shaft 12 terminates in a cup-shaped outer race 14. The outer race 14 surrounds an integral and enlarged inner race portion 16 of an axle shaft 18. An annular cover member 20 is secured to the open end of the outer race 14 by means of a plurality of bolts 22 which extend through aligned holes in the cover and the outer race. The annular cover member 20 defines an enlarged central opening 24 through which the axle shaft 18 movably extends.

A circumferential lip 26 is provided on the outer edge of the cover 20 and cooperates with an annular band 28 to secure one end of the flexible boot 30 to the cover. The other end of the boot 30 is fixedly attached to the axle shaft 18 by a ring 32. An adjusting screw 34 extends through ears on the ring 32 to facilitate assembly thereof onto the axle shaft. It is now apparent that the entire universal joint 10 is sealed so that lubricant cannot escape and contaminants may not enter. Since the boot 30 is flexible, the joint members are not restrained from relative movement.

Figure 2:
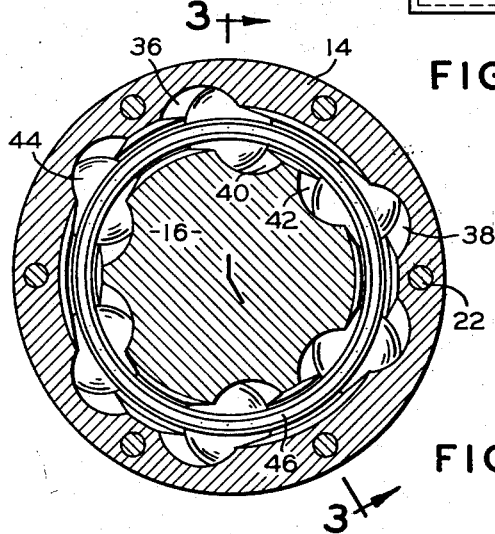
FIG. 2 is a cross sectional view of the universal joint taken substantially along the line 2—2 of FIG. 1.

In the embodiment of this invention shown in FIGS. 2 and 3, the outer race 14 is provided with alternately arranged spaced drive ball grooves 36 and 38. The grooves 36 are of a right hand helix angle or inclined in one direction whereas the grooves 38 are inclined in the opposite direction or are of a left hand helix angle. The grooves 36 are disposed at a greater helix angle or inclination than the grooves 38.

The inner race 16 is also provided with alternately arranged spaced drive ball grooves 40 and 42. The grooves 40 in the inner race are positioned in cooperating relationship with the grooves 36 in the outer race and have the same helix angle as the grooves 36 but are disposed in the opposite direction so that the planes of the axis of the grooves 36 and 40 intersect. Similarly, the grooves 42 in the inner race are positioned in cooperating relationship with and have the same helix angle as the grooves 38 in the outer race while being disposed in the opposite direction thereto. Thus, it is apparent that the inner and outer races 16 and 14 are provided with two pluralities of cooperating grooves 36, 40 and 38, 42 with each plurality in intersecting relationship, and with the plurality of grooves 36, 40 being of a greater helix angle than the plurality of grooves 38, 42.

A drive ball 44 is disposed at the intersection of and in registration with each of the cooperating plurality of grooves 36, 40 and 38, 42 and is operable to transmit torque between the inner and outer races 16 and 14. An annular drive ball cage disposed in spaced relationship relative to the races 14 and 16 is provided with a plurality of spaced circumferentially elongated openings 48 which receive the drive balls 44. As is well known and understood in the art, the drive ball cage 46 along with the helical intersecting grooves 36, 40 and 38, 42 position the drive balls 44 in a single plane which always bisects the angle defined by the axis of the shafts 12 and 18 to effect the transfer of torque at a constant velocity.

In FIG. 3 the groove 36 in the outer race and the groove 40 in the inner race are shown out of their proper helical displacement and as axial grooves so that the relationship of the cooperating parts may be more clearly illustrated.

Figure 4:
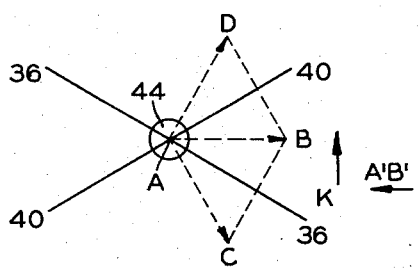

FIG. 4 is a vector analysis of the forces imposed on the balls 44 disposed in the grooves 36 and 40 having the larger helix angles. The line 36—36 represents the groove 36 in the outer race 14 and the line 40—40 represents the groove 40 in the inner race 16. The arrow K indicates the direction that torque is being applied from groove 36—36 to groove 40—40 through the ball 44. The vector AD represents the normal load applied to the ball 44 by groove 36—36; the vector AC represents the normal reaction load applied on the ball 44 by groove 40—40. By completing the vector diagram, the resultant axial force on each ball 44 is represented by vector AB.

Figure 5:
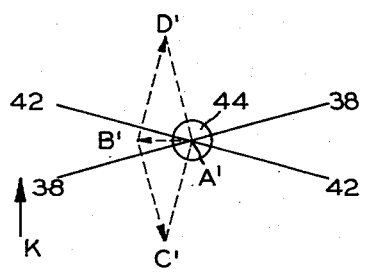
FIGS. 4 and 5 are diagrammatic views of the grooves and the drive balls with a vector analysis of the forces imposed upon the drive balls.

FIG. 5 is a vector analysis of the forces imposed on the balls 44 disposed in the grooves 38 and 42 having the smaller helix angles. Line 38—38 represents the groove 38 in the outer race 14 and the line 42—42 represents the groove 42 in the inner race 16. The arrow K indicates the direction that torque is being applied from groove 38—38 to groove 42—42 through ball 44. The vector A'D' represents the normal load applied on ball 44 by groove 38—38; the vector A'C' represents the normal reaction load applied on ball 44 by groove 42—42. By completing the vector diagram, the resultant axial force on each ball 44 is represented by vector A'B'. Since the vector AB is of greater magnitude than the vector A'B', it is readily apparent that the larger the helix angle of the intersecting grooves, the greater will be the axial force obtained therefrom.

Figure 6:
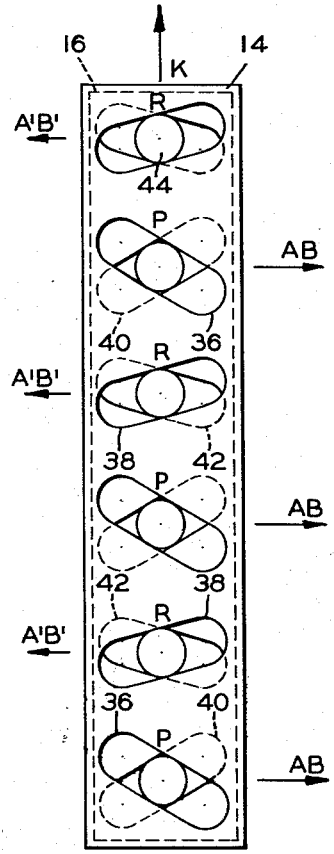
FIG. 6 is a diagrammatic view in the nature of a development showing the relationship of the grooves in the inner and outer races and the positioning of the drive balls.

FIG. 6 is a diagrammatic view in the nature of a development of the inner and outer races 16 and 14 illustrating the position of the balls 44 and the grooves 36, 40 and 38, 42. For the purposes of illustration the cooperating grooves 36 and 40 in the outer and inner races respectively have been labeled P while the cooperating grooves 38 and 42 in the outer and inner races respectively have been labeled R. As illustrated in FIGS. 4 and 5, assuming that torque is being applied to the outer race 14 in the direction of arrow K, the grooves P each supply an axial force AB on the balls 44 positioned in the grooves P to tend to move the balls in one direction whereas the grooves R supply an axial force A'B' in the opposite direction to the balls 44 disposed in the grooves R. However, all the balls 44 are embraced by the cage 46 and must move as a unit. Since the axial forces imposed by the larger helix angle grooves P are of greater magnitude, there is an unbalanced axial load which urges all the balls 44 contained in the cage 46 in the direction of the arrows AB. Since the outer race 14 is fixed against axial movement, the entire effective unbalanced load on the balls 44 is transferred to the inner race 16 tending to move the same axially in the direction of arrows AB. This axial movement of the inner race 16 changes the effective length of the axle shaft 18 and produces the telescoping action for the desired anti-squat effect. While the grooves 36, 40 and 38, 42 have been shown and described as helical grooves, it is apparent that other grooves, such as diagonal grooves, will also operate successfully. Since the balls 44 can only be positioned within the groove intersections, when no torque is being transferred between the races 16 and 14 and they are disposed with zero angle between their axes there is no need for further positioning means. When the joint 10 is operating with the races 16 and 14 disposed at large angles to each other, two of the grooves in cooperating relationship become aligned. The balls 44 contained within these grooves will not be positioned by these aligned grooves and therefore the cage 46 is provided to position these balls in the same plane as the balls confined in the intersection of the other grooves. Furthermore when torque is transferred between the inner and outer races 16 and 14 in the direction of the arrow K, the balls in the P grooves will be urged to move in the direction of the arrows AB and the balls in the R grooves will be urged to move in the direction of the arrows A'B' (the races 16 and 14 under this condition could allow such movement by rotating relative each other). However since the balls 44 are positioned in a single plane by the ball cage 46 they cannot move axially relative to each other, and the only relative axial movement that can take place is between the inner and outer races 16 and 14 and between the races and the cage 46. In addition since the balls cannot move axially relative to each other the races cannot move rotationally relative to each other. While the ball positioning means have been shown and described as a cage, it is understood that other positioning means are within the scope of this invention.

Figure 7:
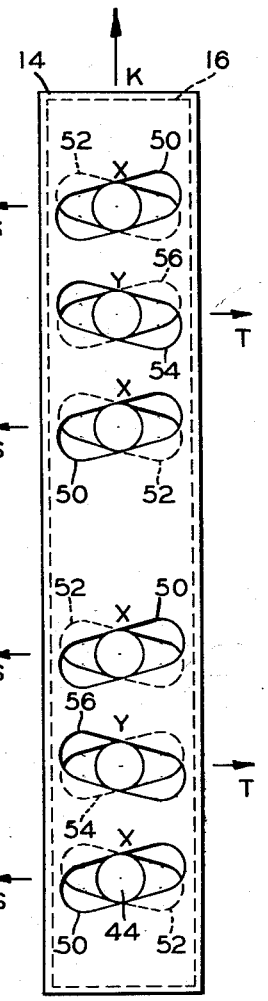
FIG. 7 is a view similar to FIG. 6 showing another embodiment of this invention.

Referring now more particularly to the embodiment of this invention shown in FIG. 7, the unbalanced axial force is obtained in another manner. In this embodiment a plurality of cooperating grooves 50 in the outer race 14 and 52 in the inner race 16 are labeled X and a plurality of grooves 54 in the outer race 14 and 56 in the inner race 16 are labeled Y. It should be particularly noted that all of the cooperating grooves X and Y while inclined oppositely are of equal helix angle; however, there are a greater number of grooves X than there are grooves Y. In all other respects the elements of this embodiment are the same as the previous embodiment.

Similar to the previous embodiment, assuming that torque is being applied to the outer race 14 in the direction of arrow K, the cooperating grooves X impose an axial force on the balls 44 contained therein in the direction of arrows S and the cooperating grooves Y impose an axial force on the balls 44 contained therein in the direction of the arrows T. The balls 44 in the grooves X and Y are therefore being urged in opposite directions. Since there are more grooves X than grooves Y, there is an unbalanced axial force in the direction of arrows S. As in the previous embodiment the resultant unbalanced axial force urges the races 16 and 14 axially relative to each other and since the outer race 14 is fixed against axial displacement, the unbalanced force is transferred to the inner race 16 and thus moves the same axially in the direction of the arrows S. Accordingly, this movement of the inner race 16 in the direction of arrows S produces the desired telescopic action resulting in a change in the effective length of the axle shaft 18.

It should be noted that although an unbalance of axial forces has been provided to urge the desired telescoping action, these unbalanced axial forces must be circumferentially balanced so that binding of the joint does not result. More specifically the races shown diagrammatically in FIG. 7 have the grooves X displaced 90° from each other and the grooves Y 180° from each other with each groove Y equidistant from the adjoining groove X. In this manner the forces between the races through axially unbalanced are circumferentially balanced. While six cooperating grooves have been shown in this embodiment, various other numbers may be employed to obtain the desired function with the condition that the grooves be of balanced circumferential displacement.

It is readily apparent from an observation of FIGS. 2 and 3 that under static unloaded conditions no means are provided to maintain the cage 46 suspended between the outer and inner races 14 and 16; therefore, the effect of gravity may cause the cage to move radially into engagement with one or both of the races. However, when torque is being transmitted by the joint 10, alternate balls 44 are urged in opposite axial directions by the drive ball grooves; this opposite urging is confined by the cage 46 so that the balls 34 remain in uniplanar relationship and the urging loads tends to centralize the cage 16 relative to the outer and inner races 14 and 16.

In addition, due to dimensional tolerances or as a result of intention, the cage 46 may lightly engage either the outer and/or inner races 14 and 16. As clearly discussed in this invention, as the outer and inner races 14 and 16 move axially relative to each other, the balls 44 positioned in the grooves therebetween must move relative to both the races. As a result, the cage 46 must also move relative to both races. Therefore, the engagement of the cage 46 with the outer and/or inner races 14, 16 is not of a positioning nature, and it is not necessary for the proper operation of the joint. The joint will operate satisfactorily with the races free from engagement with the cage or with a slight non-positioning engagement as previously mentioned.

It is now apparent from the foregoing that constant velocity universal joints have been described that will accommodate relative angular and axial movement between the driving and driven means and which upon the transmission of torque between the driving and driven means will urge the same axially relative to each other. It is also apparent that the unbalanced axial urging force may be varied as desired merely by changing the helix angle and thereby changing the angle of intersection of the grooves or by adding or subtracting additional grooves.

The preferred embodiments of this invention have been shown and described, but changes and modifications can be made and it is understood that this description is illustrative only and not for the purpose of rendering this invention limited to the details illustrated or described, except insofar as they have been limited by the terms of the following claims.

What is claimed is:

1. A constant velocity universal joint comprising an outer member having an axial opening therein, an inner member received in the axial opening in said first member, a first and a second plurality of receiving means in said outer member, each of said first plurality receiving means in said outer member having an axis with both axial and transverse components, each of said second plurality of receiving means in said outer member having an axis with both axial and transverse components and inclined in a direction opposite to the direction of said first plurality of receiving means with respect to the axis of the outer member, said inner member having a first and a second plurality of receiving means on the periphery thereof, said first plurality of receiving means on said inner member being disposed at the same angle to the axis of said inner member as said first plurality of receiving means in said outer member is disposed to the axis of said outer member but in the opposite direction, said second plurality of receiving means on said inner member being disposed at the same angle to the axis of said inner member as said second plurality of receiving means in said outer member is disposed to the axis of said outer member but in the opposite direction, said first plurality of receiving means in said outer member arranged in cooperating relation with said first plurality of receiving means in said inner member, said second plurality of receiving means in said outer member arranged in cooperating relation with said second plurality of receiving means in said inner member, torque transferring means received in each of said plurality of cooperating receiving means, and being adapted to transfer torque therebetween while being urged axially thereby, said first pluralities of receiving means in said members being adapted to urge said torque transferring means received therein with a greater and opposite total force than said second pluralities of receiving means is adapted to urge said torque transferring means received therein, and positioning means maintaining said torque transferring means in a single plane, said inner and outer members being relatively movable angularly and axially while transferring torque therebetween at a constant velocity.

2. A constant velocity universal joint comprising an outer member having an axial opening therein, an inner member received in the axial opening in said outer member, a first and a second like plurality of receiving means in said outer member, each of said first plurality of receiving means in said outer member having an axis with both axial and transverse components, each of said second plurality of receiving means in said outer member having an axis with both axial and transverse components and inclined in a direction opposite to the direction of said first plurality of receiving means with respect to the axis of the outer member, said inner member having a first and a second like plurality of receiving means on the periphery thereof, said first plurality of receiving means on said inner member being disposed at the same angle to the axis of said inner member as said first plurality of receiving means in said outer member is disposed to the axis of said outer member but in the opposite direction, said second plurality of receiving means on said inner member being disposed at the same angle to the axis of said inner member as said second plurality of receiving means in said outer member is disposed to the axis of said outer member but in the opposite direction, said first plurality of receiving means in said outer member arranged in cooperating relation with said first plurality of receiving means in said inner member, said second plurality of receiving means in said outer member arranged in cooperating relation with said second plurality of receiving means in said inner member, a plurality of drive balls with at least one received in each of said plurality of cooperating receiving means, said first pluralities of receiving means in said members being adapted to urge said drive balls received therein with a greater and opposite total force than said second pluralities of receiving means is adapted to urge said drive balls received therein, and positioning means maintaining said plurality of drive balls in a single plane, said inner and outer members being relatively movable both angularly and axially while transferring torque therebetween at a constant velocity.

3. A constant velocity universal joint as defined in claim 2 wherein said pluralities of receiving means comprise helical grooves.

4. A constant velocity universal joint comprising an outer member having an axial opening therein, an inner member received in the opening in said outer member, a first and a second plurality of receiving means in said outer member, each of said first plurality of receiving means having an axis with both axial and transverse components, each of said second plurality of receiving means having an axis with both axial and transverse components and inclined in a direction opposite to the direction of said first plurality of receiving means with respect to the axis of the outer member, said inner member having a first and a second plurality of receiving means on the periphery thereof, said first plurality of receiving means on said inner member being disposed at the same angle to the axis of said inner member as said first plurality of receiving means in said outer member is disposed to the axis of said outer member but in the opposite direction, said second plurality of receiving means on said inner member being disposed at the same angle to the axis of said inner member as said second plurality of receiving means in said outer member is disposed to the axis of said outer member but in the opposite direction, said first plurality of receiving means in said outer member being arranged in cooperating relation with said first plurality of receiving means in said inner member, said second plurality of receiving means in said outer member being arranged in cooperating relation with said second plurality of receiving means in said inner member, torque transferring means received in each of said plurality of said cooperating receiving means, positioning means maintaining said torque transferring means in a single plane, said inner and outer members being adapted for relative angular and axial movement, and said first pluralities of receiving means being disposed at an inclination different from the inclination of said second pluralities of receiving means with respect to the axis of their respective member whereby when torque is transferred between said members they are urged to move axially relative to each other.

5. A constant velocity universal joint comprising an outer member having an axial opening therein, an inner member received in the axial opening in said outer member, a first and a second like plurality of receiving means in said outer member, each of said first plurality of receiving means having an axis with both axial and transverse components, each of said second plurality of receiving means having an axis with both axial and transverse components and inclined in a direction opposite to the direction of said first receiving means with respect to the axis of the outer member, said inner member having a first and a second like plurality of receiving means on the periphery thereof, said first plurality of receiving means on said inner member being disposed at the same angle to the axis of said inner member as said first plurality of receiving means in said outer member is disposed to the axis of said outer member but in the opposite direction, said second plurality of receiving means on said inner member being disposed at the same angle to the axis of said inner member as said second plurality of receiving means in said outer member is disposed to the axis of said outer member but in the opposite direction, said first plurality of receiving means in said outer member being arranged in cooperating relation with said first plurality of receiving means in said inner member, said second plurality of receiving means in said outer member being arranged in cooperating relation with said second plurality of receiving means in said inner member, a plurality of drive balls with at least one received in each of said plurality of cooperating receiving means, and positioning means maintaining said plurality of driving balls in a single plane, said inner and outer members being adapted for relative angular and axial movement, and said first pluralities of receiving means being disposed at an inclination different from the inclination of said second pluralities of receiving means with respect to the axis of their respective member whereby when torque is transferred between said members they are urged to move axially relative to each other.

6. A constant velocity universal joint as defined in claim 5 wherein said pluralities of receiving means comprise helical grooves.

7. A constant velocity universal joint comprising an outer race having an axial opening therein, an inner race received in the axial opening in said outer race, a first and a second like plurality of receiving means in said outer race, said receiving means each having an axis with both axial and transverse components with the axis of the second plurality of receiving means inclined in a direction opposite to the direction of the axis of said first plurality of receiving means with respect to the axis of the outer member, said inner race having a first and a second like plurality of receiving means on the periphery thereof, said first plurality of receiving means on said inner member being disposed at the same angle to the axis of said inner member as said first plurality of receiving means in said outer race is disposed to the axis of said outer race but in the opposite direction, said second plurality of receiving means on said inner race being disposed at the same angle to the axis of said inner race as said second plurality of receiving means in said outer race is disposed to the axis of said outer race but in the opposite direction, said first plurality of receiving means in said outer race being arranged in cooperating relation with said first plurality of receiving means in said inner race and said second plurality of receiving means in said outer race being arranged in cooperating relation with said second plurality of receiving means in said inner race, a plurality of drive balls with at least one received in each of said plurality of cooperating receiving means to transfer torque therebetween, cage means embracing the plurality of balls and positioning said plurality of balls in a single movable plane, said inner and outer races being adapted for relative angular and axial movement and said first pluralities of cooperating receiving means being disposed at an inclination different from the inclination of said second pluralities of cooperating receiving means with respect to the axis of their respective races whereby when torque is transferred between said races they are urged to move axially relative to each other while transferring rotary motion at a constant velocity.

8. A constant velocity universal joint comprising an outer member having an axial opening therein, an inner member received in the axial opening in said outer member, a first and a second plurality of receiving means in said outer member, each of said first plurality of receiving means in said outer member having an axis with both axial and transverse components, each of said second plurality of receiving means in said outer member having an axis with both axial and transverse components and inclined in a direction opposite to the direction of said first receiving means with respect to the axis of the outer member, said inner member having a first and second plurality of receiving means on the periphery thereof, said first plurality of receiving means on said inner member being disposed at the same angle to the axis of said inner member as said first plurality of receiving means in said outer member but in the opposite direction, said second plurality of receiving means on said inner member being disposed at the same angle to the axis of said inner member as said second plurality of receiving means in said outer member is disposed to the axis of said outer member but in the opposite direction, said first plurality of receiving means in said outer member being arranged in cooperating relation with said first plurality of receiving means in said inner member, and said second plurality of receiving means in said outer member being arranged in cooperating relation with said second plurality of receiving means in said inner member, torque transferring means received in each of said plurality of cooperating receiving means, and positioning means maintaining said torque transferring means in a single plane, said inner and outer members being adapted for relative angular and axial movement, and said first pluralities of receiving means being greater in number than said second pluralities of receiving means whereby when torque is transferred between said inner and outer members they are urged to move axially relative to each other.

9. A constant velocity universal joint as defined in claim 8 wherein said receiving means comprise helical grooves and said torque transferring means comprise drive balls.

10. A constant velocity joint as defined in claim 9 wherein said positioning means comprise a drive ball cage.

11. A constant velocity universal joint comprising a first member, a second member operatively associated with said first member, a first and second plurality of groove means in said first member, each of said first plurality of groove means having an axis displaced from the axial direction with respect to the axis of the first member, each of said second plurality of groove means having an axis displaced from the axial direction with respect to the axis of the first member and with greater and opposite displacement with respect to the first plurality of groove means, a first and a second plurality of groove means in said second member, said first plurality of groove means in said second member, being disposed in complementary and mirror image relationship with said first plurality of groove means in said first member, said second plurality of groove means in said second member being disposed in complementary and mirror image relationship with said second plurality of groove means in said first member, a plurality of torque transferring means with at least one received in each of said plurality of cooperating groove means and positioning means maintaining said plurality of torque transferring means in a single plane, said first and second members being adapted for relative angular and axial movement, whereby when torque is transferred between said members they are urged to move axially relative to each other while transferring torque at a constant velocity.

12. An axial urging constant velocity universal joint comprising, a first member, a second member operatively associated with said first member, a first and a second plurality of receiving means in each of said members, with said first plurality of said receiving means in said members disposed in cooperating relationship and said second plurality of receiving means in said members disposed in cooperating relationship, torque transferring means received in said receiving means and adapted to transfer torque therebetween while being urged axially thereby, means including at least said receiving means for maintaining said torque transferring means in a single plane bisecting the angle defined by the intersection of the axes of said members, said first pluralities of receiving means in said members urging said torque transferring means received therein with a greater and opposite total force than said second pluralities of receiving means urges said torque transferring means received therein, whereby when torque is transferred between said members they are urged to move axially relative to each other.

References Cited in the file of this patent

UNITED STATES PATENTS

| | | |
|---|---|---|
| 2,309,939 | Dodge | Feb. 2, 1943 |
| 2,321,448 | Anderson | June 8, 1943 |
| 2,322,570 | Dodge | June 22, 1943 |
| 2,325,460 | Amberg | July 27, 1943 |
| 2,618,942 | Dodge | Nov. 25, 1952 |

UNITED STATES PATENT OFFICE
CERTIFICATE OF CORRECTION

Patent No. 3,071,944              January 8, 1963

Philip John Mazziotti et al.

It is hereby certified that error appears in the above numbered patent requiring correction and that the said Letters Patent should read as corrected below.

Column 3, line 51, after "cage" insert -- 46 --; column 5, line 40, for "through" read -- though --.

Signed and sealed this 27th day of August 1963.

(SEAL)
Attest:

ERNEST W. SWIDER
Attesting Officer

DAVID L. LADD
Commissioner of Patents